(12) United States Patent
Hennenlotter

(10) Patent No.: US 7,130,278 B1
(45) Date of Patent: Oct. 31, 2006

(54) MULTI-LAYERED CROSS-SECTIONAL DIAGRAM OF A NETWORK

(75) Inventor: William Hennenlotter, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 817 days.

(21) Appl. No.: 09/891,778

(22) Filed: Jun. 25, 2001

(51) Int. Cl.
*H04L 12/28* (2006.01)
*H04L 12/56* (2006.01)

(52) U.S. Cl. .................... 370/254; 370/255; 370/257
(58) Field of Classification Search ................ 370/254, 370/255, 257, 258, 241, 244, 245, 216
See application file for complete search history.

(56) References Cited

U.S. PATENT DOCUMENTS

| | | | |
|---|---|---|---|
| 5,473,602 A * | 12/1995 | McKenna et al. .......... 370/256 |
| 6,035,331 A * | 3/2000 | Soga et al. ................. 709/223 |
| 6,078,575 A * | 6/2000 | Dommety et al. .......... 370/338 |
| 6,308,282 B1 * | 10/2001 | Huang et al. ................... 714/4 |
| 6,366,584 B1 * | 4/2002 | Gulliford et al. ........... 370/403 |
| 6,456,600 B1 * | 9/2002 | Rochberger et al. ........ 370/255 |
| 6,618,366 B1 * | 9/2003 | Furukawa et al. .......... 370/338 |
| 6,754,207 B1 * | 6/2004 | Hesse ......................... 370/388 |
| 6,757,297 B1 * | 6/2004 | Chin ........................... 370/469 |
| 6,823,408 B1 * | 11/2004 | Nakamura et al. .......... 710/100 |
| 6,842,780 B1 * | 1/2005 | Frei et al. ................... 709/221 |
| 2001/0042118 A1 * | 11/2001 | Miyake et al. .............. 709/223 |
| 2002/0089964 A1 * | 7/2002 | Hansen et al. .............. 370/341 |

* cited by examiner

*Primary Examiner*—Chirag Shah

(57) ABSTRACT

A multi-layered cross-sectional diagram and a method of diagramming a network by using the multi-layered cross-sectional diagram are described. The multi-layered cross-sectional diagram exhibits sufficient modularity, scalability, and size flexibility to handle a wide range of networks and to deal with a wide variety of network sizes, including small networks, growing networks, and large networks. In addition, the multi-layered cross-sectional diagram facilitates localized modifications to reflect changes in the network.

36 Claims, 8 Drawing Sheets

MULTI-LAYERED CROSS-SECTIONAL DIAGRAM OF A NETWORK

BACKGROUND OF THE INVENTION

1. Field of the Invention

The present invention generally relates to diagrams of networks. More particularly, the present invention relates to the field of diagramming a network by using a multi-layered cross-sectional diagram.

2. Related Art

Networks, such as computer networks, telephone networks, data networks, communication networks, or any other type of network, can be better understood if they are diagrammed. The diagram promotes comprehension, direction, and documentation. In particular, the diagram enables the discovery of how the devices of the network work together, points out the deficiencies and advantages of the network, and memorializes information for future reference.

Difficulties are encountered when diagramming large networks or updating the diagrams of networks that have grown in size. Generally, network diagram complexity is proportional to network size. FIG. 1 illustrates a first conventional diagram 10 of a network. As depicted in FIG. 1, the network includes numerous devices (e.g., servers, routers, switches, computers, etc.) and numerous connections 11 among these devices. There are several types of devices, such as first type devices 12A–12S, second type devices 14A–14L, third type devices 16A–16F, and fourth type devices 18A–18C. In the first conventional diagram 10, the devices are scattered about, mirroring the physical (or real) distribution of these devices. The backbone of the network is not apparent. Moreover, the first conventional diagram 10 is difficult to follow and provides little organization and benefit, but is easy to craft.

FIG. 2 illustrates a second conventional diagram 20 (or tree diagram) of the network described in FIG. 1. In the tree diagram 20, the numerous devices (e.g., servers, routers, switches, computers, etc.) are arranged into multiple hierarchical layers, whereas a trunk layer, a limb layer, a branch layer, and a twig layer represent different hierarchical layers. For example, the devices 18A–18C (FIG. 1) form a group 22 in the trunk layer. The devices 16A–16F (FIG. 1) form the groups 24A–24C in the limb layer, whereas each group 24A–24C represents a limb. In addition, the devices 14A–14L (FIG. 1) form the groups 26A–26F in the branch layer, whereas each group 26A–26F represents a branch. Lastly, the devices 12A–12S (FIG. 1) form the groups 28A–28S in the twig layer, whereas each group 28A–28S represents a twig. The tree diagram 20 depicts numerous connections 11 among the groups, whereas the devices are grouped according to any criteria, including geographical location, function, type, etc. In contrast to the first conventional diagram 10, the tree diagram 20 makes apparent the interrelations of the different hierarchical layers, organizes the numerous connections 11, and increases the understanding of the network.

Furthermore, FIG. 3 illustrates a third conventional diagram 30 (or cross-sectional diagram) of the network described in FIGS. 1 and 2, whereas the devices are arranged into hierarchical layers and groups as described in FIG. 2. In the cross-sectional diagram 30, the center portion 32 represents the highest hierarchical layer (e.g., the trunk layer of FIG. 2). Moreover, the rings 34, 36, and 38 represent different lower hierarchical layers (e.g., the limb layer, the branch layer, the twig layer). Moreover, the cross-sectional diagram 30 facilitates distinguishing the hierarchical layers of the network and clarifies the groupings (or divisions) of devices within each hierarchical layer.

Unfortunately, the first conventional diagram 10, the tree diagram 20, and the cross-sectional diagram 30 are limited in several aspects. First, these diagrams lack sufficient scalability to deal with growing networks. Moreover, they fall short in providing enough modularity for easy construction of a wide range of networks. More importantly, in the case of large networks, the size of these diagrams become unwieldy.

SUMMARY OF THE INVENTION

A multi-layered cross-sectional diagram and a method of diagramming a network by using the multi-layered cross-sectional diagram are described. The multi-layered cross-sectional diagram exhibits sufficient modularity, scalability, and size flexibility to handle a wide range of networks and to deal with a wide variety of network sizes, including small networks, growing networks, and large networks. In addition, the multi-layered cross-sectional diagram facilitates localized modifications to reflect changes in the network.

The multi-layered cross-sectional diagram has a plurality of cross-sectional representations arranged in a fractal-like structure manifesting self-similarity, enabling hierarchical layers of the network to be diagrammed independent of one another in reasonable detail. Moreover, in the multi-layered cross-sectional diagram, each hierarchical layer of the network is represented by one or more cross-sectional representations. In particular, a reduced-size cross-sectional representation associated with a lower hierarchical layer is located in the cross-sectional representation associated with a higher hierarchical layer. Whenever necessary, a cross-sectional representation associated with the lower hierarchical layer is formed to reveal the relevant details of the lower hierarchical layer and some details of an even lower hierarchical layer, whereas the cross-sectional representation associated with the lower hierarchical layer is an enlarged version of the reduced-size cross-sectional representation associated with the lower hierarchical layer. In essence, the multi-layered cross-sectional diagram has diagrams within diagrams, within diagrams, within diagrams, to the nth degree.

These and other advantages of the present invention will no doubt become apparent to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the present invention.

Figure 1:
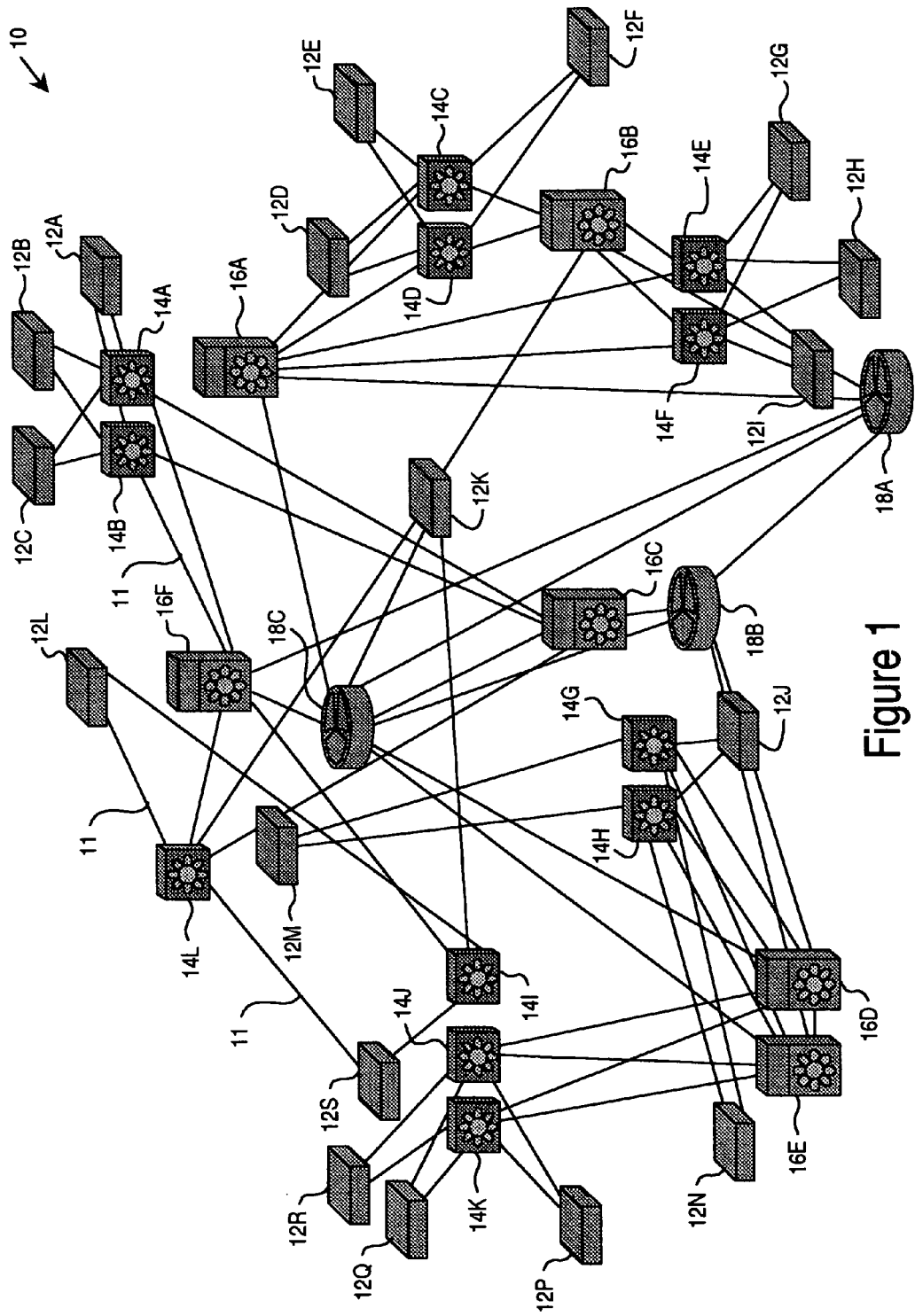
FIG. 1 illustrates a first conventional diagram of a network.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, a variety of terms are discussed that refer to the actions and processes of an electronic system or a computer system, or other electronic computing device/system. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical, mechanical, or quantum computers.

Exemplary Computer System Environment

Aspects of the present invention can be implemented or executed on a computer system or any other computational system. Although a variety of different computer systems can be used with the present invention, an exemplary computer system 100 is shown in FIG. 4.

Figure 4:
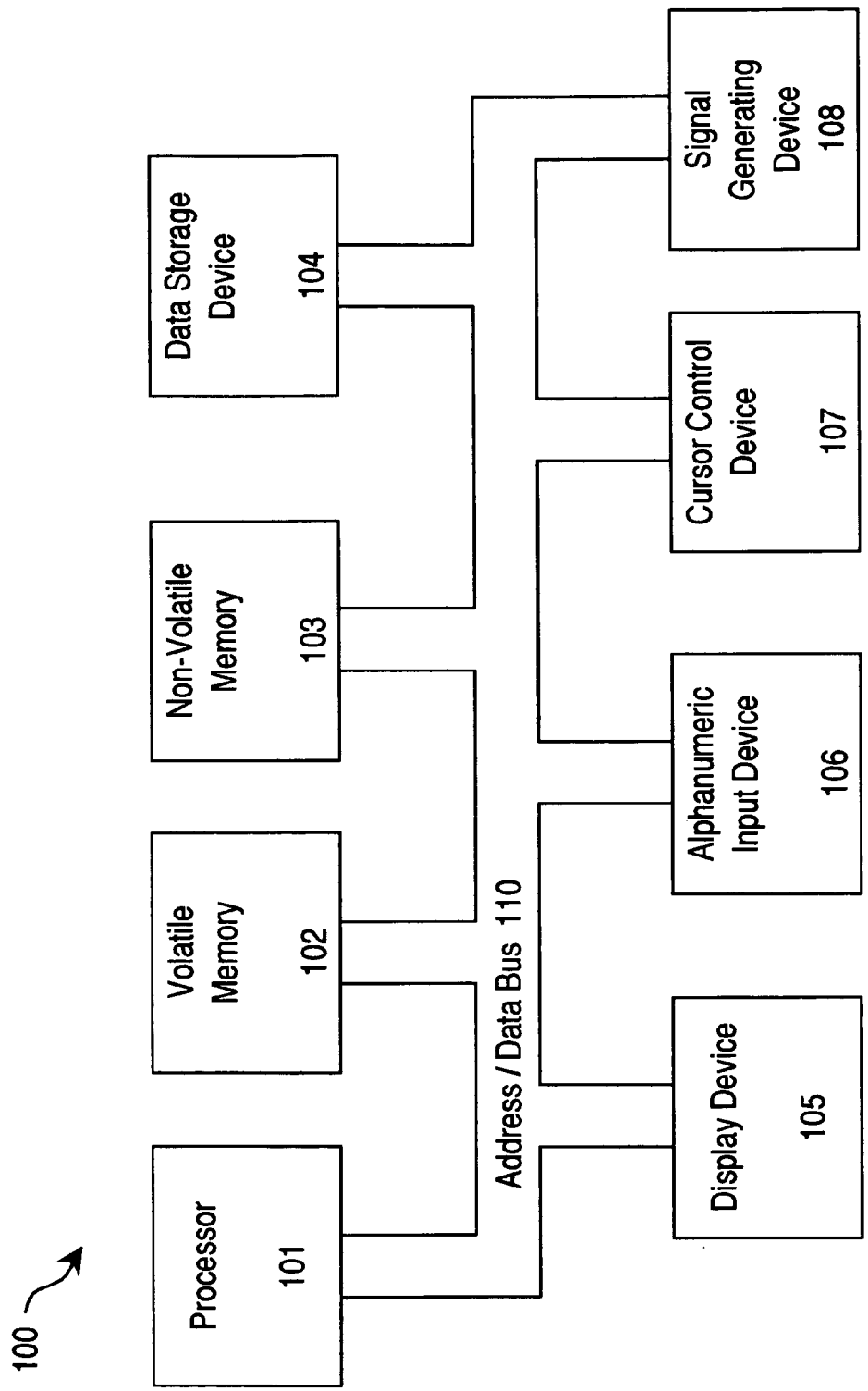
FIG. 4 illustrates an exemplary computer system on which the present invention can be practiced.

With reference to FIG. 4, portions of the present invention are comprised of computer-readable and computer executable instructions which reside, for example, in computer-usable media of an electronic system such as the exemplary computer system. FIG. 4 illustrates an exemplary computer system 100 on which embodiments of the present invention may be practiced. It is appreciated that the computer system 100 of FIG. 4 is exemplary only and that the present invention can operate within a number of different computer systems including general-purpose computer systems and embedded computer systems.

Computer system 100 includes an address/data bus 110 for communicating information, a central processor 101 coupled with bus 110 for processing information and instructions, a volatile memory 102 (e.g., random access memory RAM) coupled with the bus 110 for storing information and instructions for the central processor 101 and a non-volatile memory 103 (e.g., read only memory ROM) coupled with the bus 110 for storing static information and instructions for the processor 101. Exemplary computer system 100 also includes a data storage device 104 ("disk subsystem") such as a magnetic or optical disk and disk drive coupled with the bus 110 for storing information and instructions. Data storage device 104 can include one or more removable magnetic or optical storage media (e.g., diskettes, tapes) which are computer readable memories. Memory units of computer system 100 include volatile memory 102, non-volatile memory 103 and data storage device 104.

Exemplary computer system 100 can further include an optional signal generating device 108 (e.g., a network interface card "NIC") coupled to the bus 110 for interfacing with other computer systems. Also included in exemplary computer system 100 of FIG. 4 is an optional alphanumeric input device 106 including alphanumeric and function keys coupled to the bus 110 for communicating information and command selections to the central processor 101. Exemplary computer system 100 also includes an optional cursor control or directing device 107 coupled to the bus 110 for communicating user input information and command selections to the central processor 101. An optional display device 105 can also be coupled to the bus 110 for displaying information to the computer user. Display device 105 may be a liquid crystal device, other flat panel display, cathode ray tube, or other display device suitable for creating graphic images and alphanumeric characters recognizable to the user. Cursor control device 107 allows the user to dynamically signal the two-dimensional movement of a visible symbol (cursor) on a display screen of display device 105. Many implementations of cursor control device 107 are known in the art including a trackball, mouse, touch pad, joystick or special keys on alphanumeric input device 106 capable of signaling movement of a given direction or manner of displacement. Alternatively, it will be appreciated that a cursor can be directed and/or activated via input from alphanumeric input device 106 using special keys and key sequence commands.

Multi-Layered Cross-Sectional Diagram

It should be understood that the multi-layered cross-sectional diagram can be utilized to diagram any type of network (e.g., computer network, telephone network, data network, communication network, etc.). Moreover, the devices of the network can be of any type (e.g., servers, routers, switches, computers, telephone switches, telephones, etc.). Furthermore, for the multi-layered cross-sectional diagram, the devices in each hierarchical layer of the network are arranged into groups, whereas each group has one or more devices. The devices are grouped according to any criteria, including geographical location, function, type, etc.

As described above with respect to FIG. 3, the cross-sectional diagram 30 provides a cross-sectional view of the entire network. In contrast, the multi-layered cross-sectional diagram of the present invention provides a cross-sectional view of a localized portion of the network. Moreover, the multi-layered cross-sectional diagram arranges these cross-sectional views into a fractal-like structure exhibiting self-similarity and repetitive patterns. Self-similarity refers to the property that, when magnified, a small area of the multi-layered cross-sectional diagram is similar to a larger area of the multi-layered cross-sectional diagram.

Figure 2:
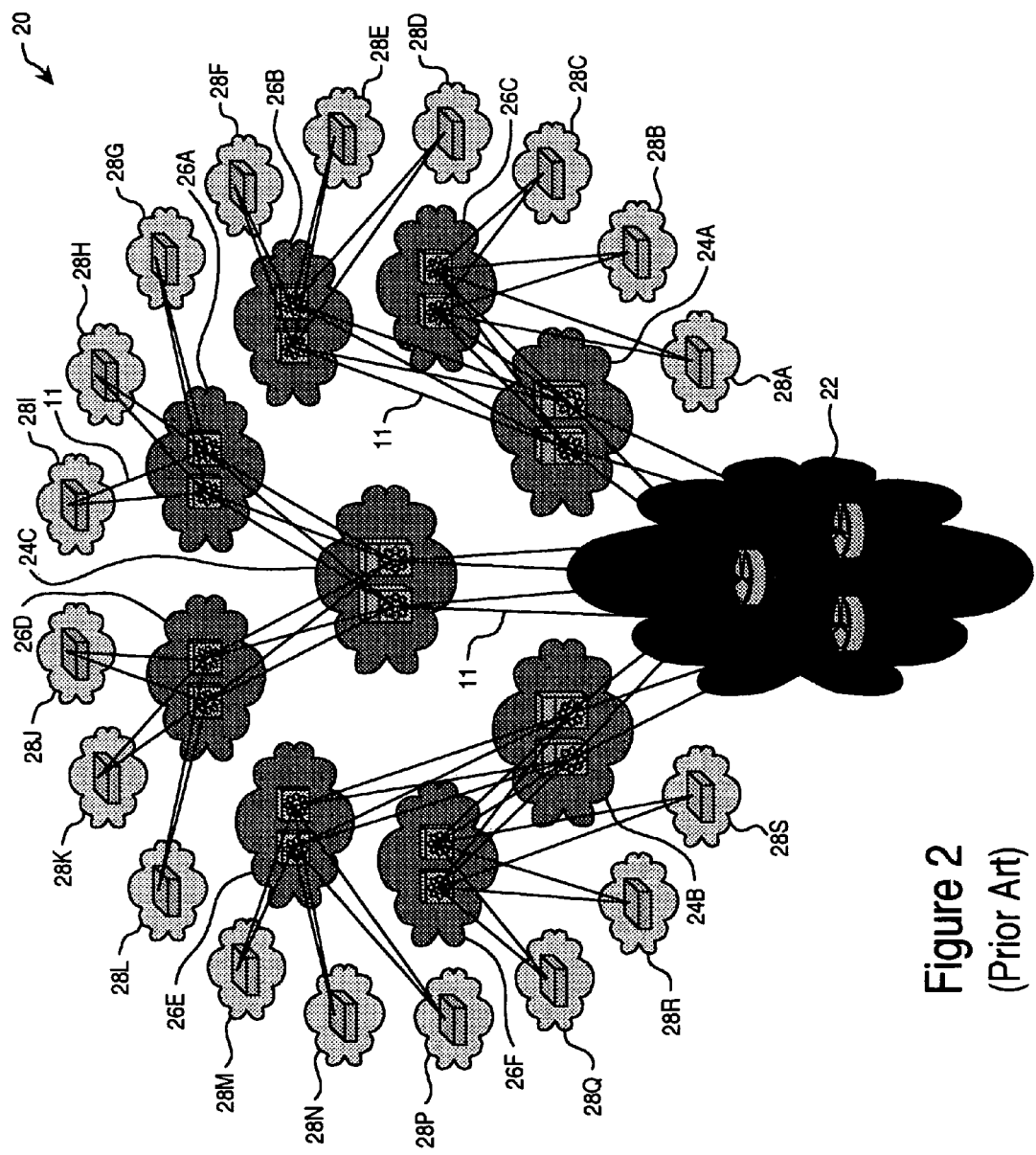
FIG. 2 illustrates a second conventional diagram (or tree diagram) of the network described in FIG. 1.
Figure 3:
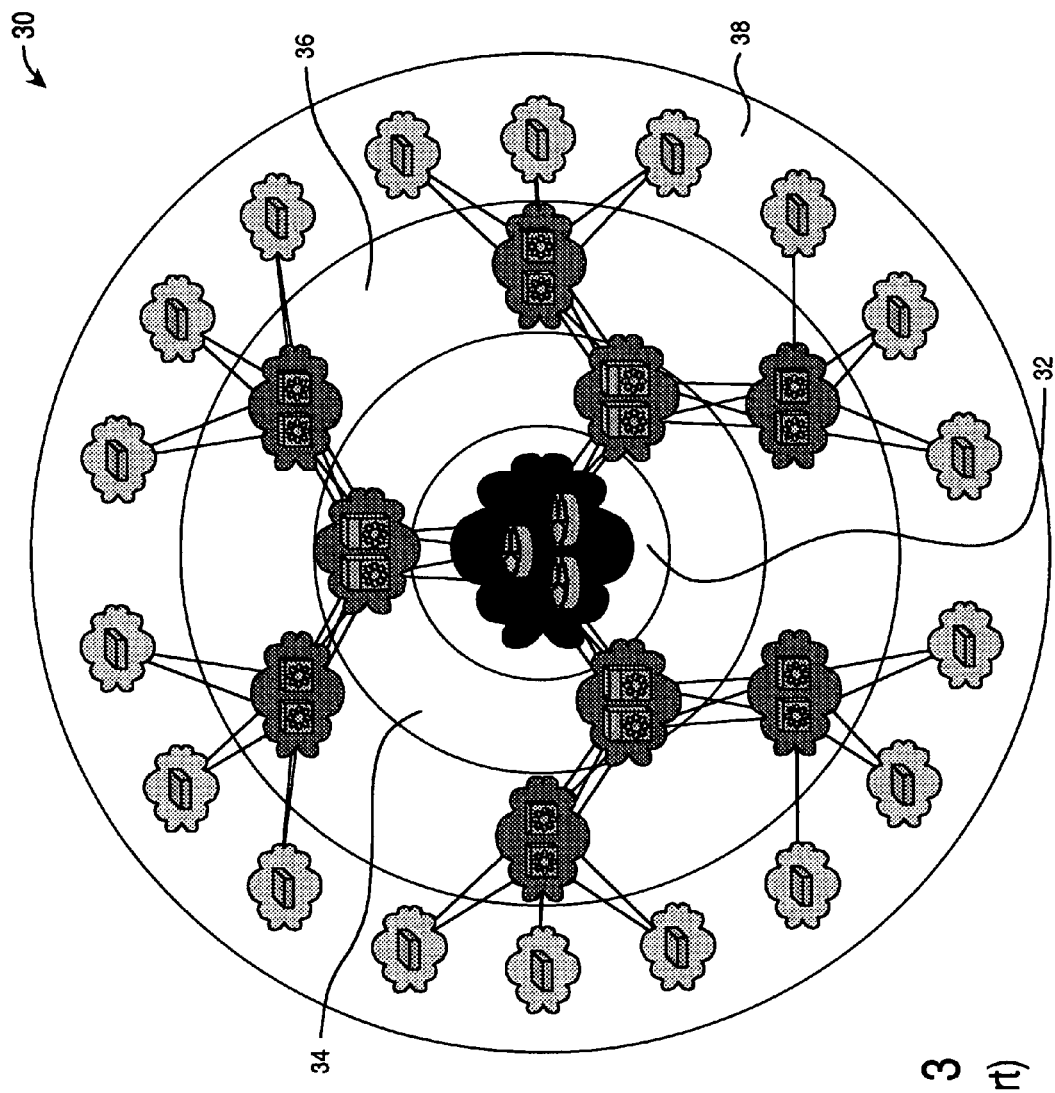
FIG. 3 illustrates a third conventional diagram (or cross-sectional diagram) of the network described in FIGS. 1 and 2.
Figure 3A:
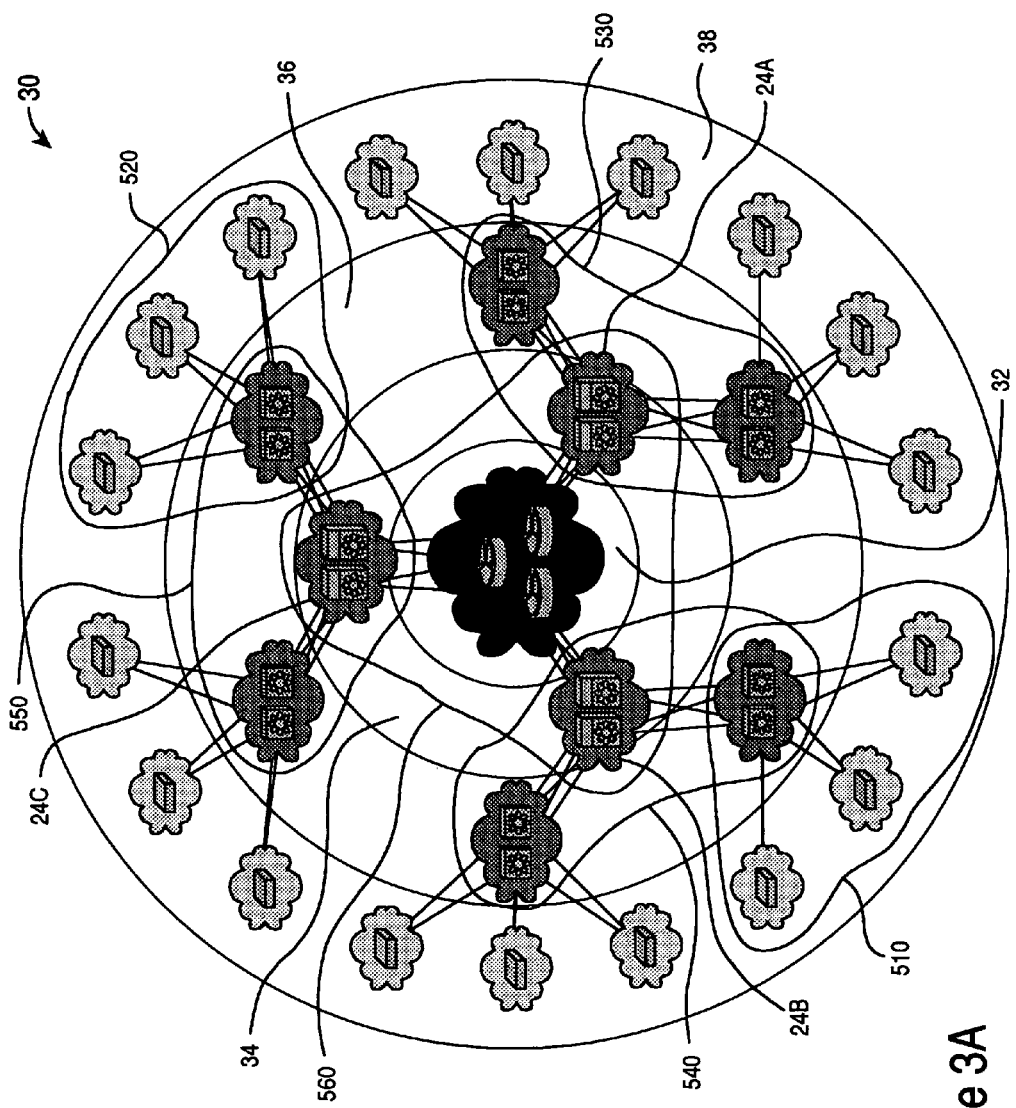
FIG. 3A illustrates the cross-sectional diagram of FIG. 3, showing the linked groups.

In particular, the multi-layered cross-sectional diagram is generated by creating a cross-sectional view of each linked group, whereas each linked group has a particular group from a hierarchical layer and has one or more groups, which are connected to the particular group, from a lower hierarchical layer. Linked groups are localized portions of the network. Several linked groups are illustrated in FIG. 3A. For example in FIG. 3A, the linked group 560 includes the group 22 (FIG. 2) from the highest hierarchical layer 32 and includes the groups 24A, 24B, and 24C (FIG. 2) from the lower hierarchical layer 34, whereas the groups 24A–24C are each connected to group 22 and form an associated group corresponding to the group 22. The linked groups 530, 540, and 550 each include one of the groups 24A, 24B, and 24C (FIG. 2) from the lower hierarchical layer 34 and include two of the groups 26A–26F (FIG. 2) from the further lower hierarchical layer 36. Moreover, the linked groups 510 and 520 each include one of the groups 26A–26F (FIG. 2) from the further lower hierarchical layer 36 and include three of the groups 28A–28S (FIG. 2) from the lowest hierarchical layer 38. Additional linked groups can be formed by the groups 26A–26F from the further lower hierarchical layer 36 and the groups 28A–28S from the lowest hierarchical layer 38.

Figure 5:
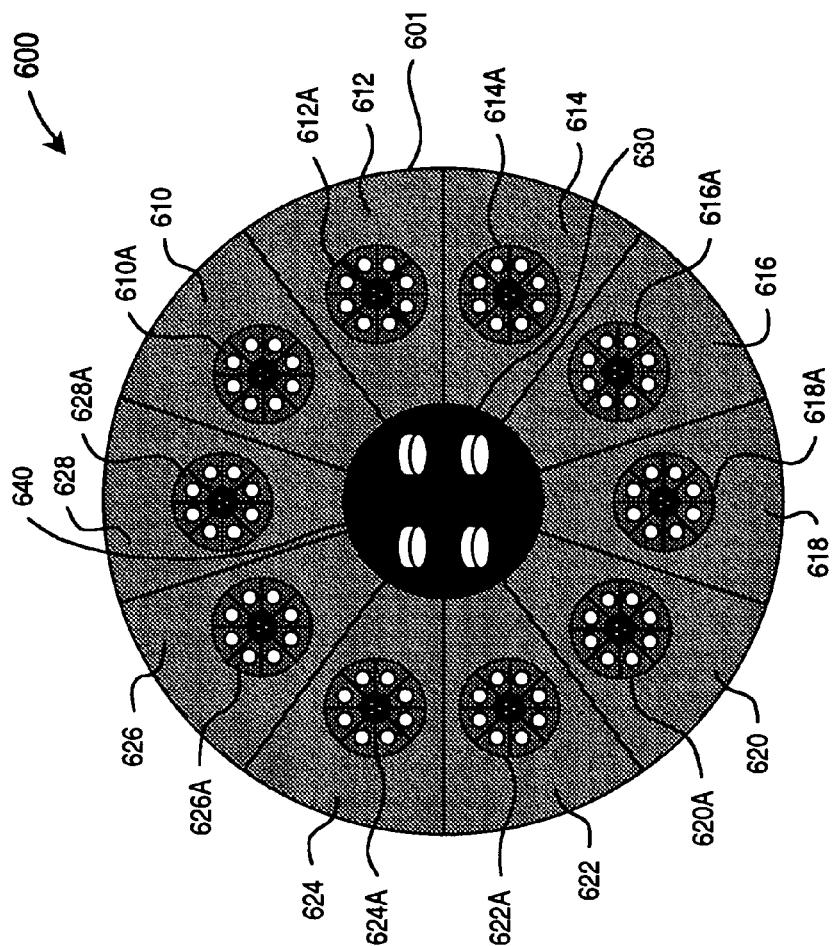
FIG. 5 illustrates an exemplary multi-layered cross-sectional diagram in accordance with an embodiment of the present invention.

FIG. 5 illustrates an exemplary multi-layered cross-sectional diagram 600 in accordance with an embodiment of the present invention. The multi-layered cross-sectional diagram 600 has a cross-sectional representation 601 having a circular shape and has a plurality of reduced-size cross-sectional representations 610A–628A having a circular shape, whereas the cross-sectional representation 601 and the reduced-size cross-sectional representations 610A–628A are similar.

The cross-sectional representation 601 provides a localized view of a network and corresponds to a linked group in the network, whereas the linked group includes a particular group from a particular hierarchical layer of the network and a first associated group which has at least one group, which is connected to the particular group, from a lower hierarchical layer of the network. Moreover, the cross-sectional representation 601 has a center portion 630 (or inner portion) and a ring-shaped portion 640 (or outer portion). It should be understood that the cross-sectional representation 601 can have other configurations.

In particular, the center portion 630 represents the particular group of the linked group in the network. The devices of the particular group can be diagrammed in the center portion 630. In addition, the interconnections among these devices, the connections between these devices and the group(s) from the lower hierarchical layer, or any other network information can also be included in the center portion 630. As illustrated in the center portion 630, the particular group of the particular hierarchical layer of the network has four devices. The particular hierarchical layer can be any of the hierarchical layers of the network, demonstrating that the exemplary multi-layered cross-sectional diagram 600 is modular.

Moreover, the ring-shaped portion 640 has one or more sections 610–628. Each section 610–628 corresponds to a group from the associated group from the linked group, whereas the group is from the lower hierarchical layer. In an embodiment, the sections 610–628 are similar in size and wedge-shaped. Here, the ring-shaped portion 640 has ten sections 610–628 because the associated group from the linked group has ten groups in the lower hierarchical layer, whereas these ten groups are connected to the particular group from the particular hierarchical layer. As an example, the cross-sectional representation corresponding to the linked group 520 (FIG. 3A) will have a center portion representing the group from the hierarchical layer 36 and will have a ring-shaped portion having three sections, each section corresponding to one of the three groups from the associated group from the hierarchical layer 38. The hierarchical layer 36 is higher than the hierarchical layer 38.

More importantly, each section 610–628 has a reduced-size cross-sectional representation 610A–628A. Each reduced-size cross-sectional representation 610A–628A corresponds to one of several second linked groups, each second linked group includes the group corresponding to one of the sections 610–628 and includes a second associated group having at least one group from a further lower hierarchical layer of the network. For example, a particular second linked group has the specific group (of the lower hierarchical layer) corresponding to the section 610 and has a second associated group which has at least one group, which is connected to the specific group, from a further lower hierarchical layer of the network. Therefore, the reduced-size cross-sectional representation 610A located in section 610 corresponds to the particular second linked group.

Moreover, each reduced-size cross-sectional representation 610A–628A has a reduced-size center portion and a reduced-size ring-shaped portion. Each reduced-size center portion represents the group corresponding to the section 610–628 in which the reduced-size center portion is located. For example, in the reduced-sized cross-sectional representation 610A, the reduced-size center portion represents the specific group (of the lower hierarchical layer) corresponding to the section 610. Moreover, each reduced-size ring-shaped portion has one or more reduced-sized sections, whereas each reduced-size section corresponds to a group from the second associated group from one of the second linked groups. For example, in the reduced-sized cross-sectional representation 610A, the reduced-size ring-shaped portion has eight reduced-size sections because, in the particular second linked group corresponding to section 610, the second associated group from the further lower hierarchical layer has eight groups. It should be understood that the configuration of each reduced-size cross-sectional representation 610A–628A depends on its corresponding second linked group. Although the configurations of the reduced-size cross-sectional representations 610A–628A in FIG. 5 are substantially identical, these configurations can vary among the reduced-size cross-sectional representations.

Furthermore, in each reduced-size cross-sectional representation 610A–628A, each reduced-size section can have a miniature version of an additional reduced-size cross-sectional representation. Each additional reduced-size cross-sectional representation corresponds to one of several third linked groups, each third linked group includes the group corresponding to one of the reduced-size sections and includes a third associated group having at least one group from an even lower hierarchical layer of the network. Moreover, each additional reduced-size cross-sectional representation has an additional reduced-size center portion and an additional reduced-size ring-shaped portion. Each additional reduced-size center portion represents the group corresponding to the reduced-size section in which the additional reduced-size center portion is located. Moreover, each additional reduced-size ring-shaped portion has one or more additional reduced-sized sections, whereas each additional reduced-size section corresponds to a group from the third associated group from one of the third linked groups.

In essence, the exemplary multi-layered cross-sectional diagram 600 has cross-sectional diagrams within cross-sectional diagrams, within cross-sectional diagrams, within cross-sectional diagrams, to the nth degree, whereas n is dependent on the number of hierarchical layers that are in the network.

Figure 6:
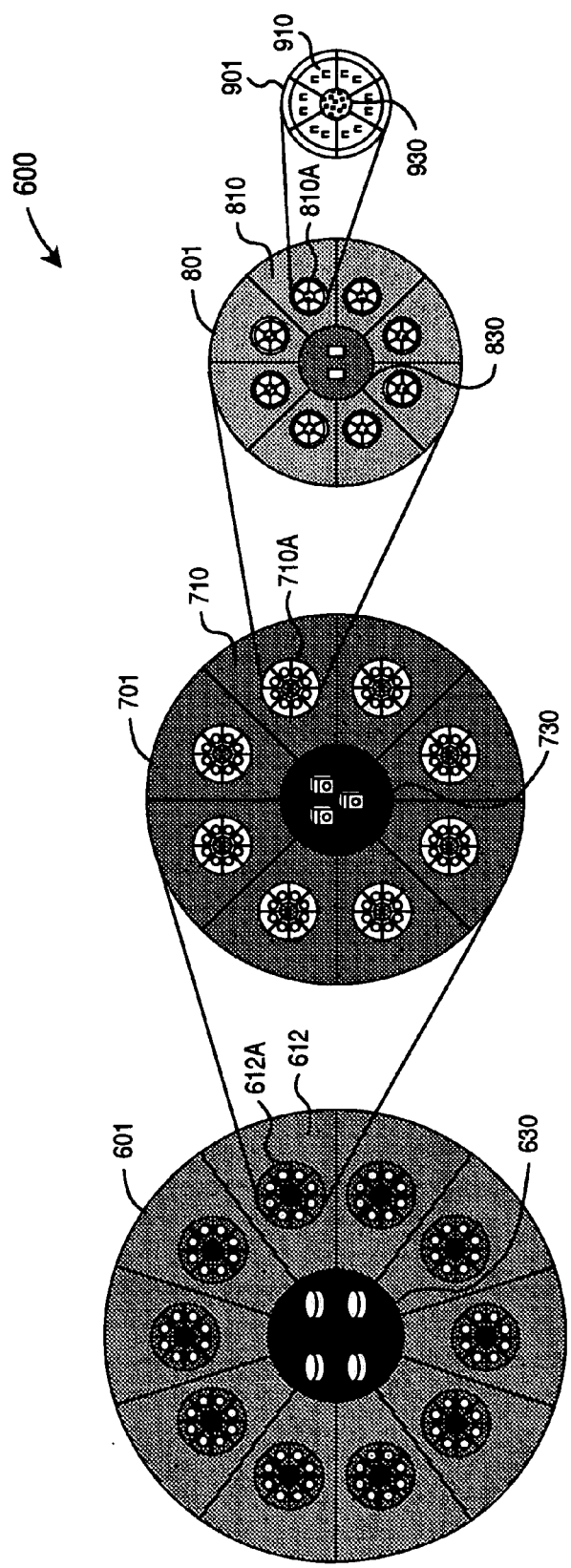
FIG. 6 illustrates the fractal-like structure of the exemplary multi-layered cross-sectional diagram of FIG. 5.

FIG. 6 illustrates the fractal-like structure of the exemplary multi-layered cross-sectional diagram 600 of FIG. 5. As depicted in FIG. 6, the exemplary multi-layered cross-sectional diagram 600 has a plurality of cross-sectional representations arranged in a fractal-like structure manifesting self-similarity, enabling hierarchical layers of the network to be diagrammed independent of one another in reasonable detail. In particular, the cross-sectional representations are similar to each other and have a plurality of sizes. Moreover, in the exemplary multi-layered cross-sectional diagram 600, each hierarchical layer of the network is represented by one or more cross-sectional representations, whereas each cross-sectional representation is adapted to represent a group from a hierarchical layer and one or more groups from another hierarchical layer as described above.

Specifically, each cross-sectional representation corresponds to a localized portion (or linked group) of the network. More importantly, FIG. 6 illustrates the size flexibility of the exemplary multi-layered cross-sectional diagram 600. The exemplary multi-layered cross-sectional diagram 600 enables the diagramming of several localized portions (or linked groups) of interest in reasonable detail without needing to diagram the entire network at once, preserving time, space, and resources. In practice, the detail level of the exemplary multi-layered cross-sectional diagram 600 is dependent on the number of cross-sectional representations. For a higher amount of detail, the number of cross-sectional representations is increased. For a lower amount of detail, the number of cross-sectional representations is decreased.

In FIG. 6, the cross-sectional representation 701 is an enlarged version of the reduced-size cross-sectional representation 612A located in section 612 of cross-sectional representation 601. Similarly, the cross-sectional representation 801 is an enlarged version of the reduced-size cross-sectional representation 710A located in section 710 of cross-sectional representation 701. Furthermore, the cross-sectional representation 901 is an enlarged version of the reduced-size cross-sectional representation 810A located in section 810 of cross-sectional representation 801. It should be understood that, in order to diagram the network and its groups arranged into the hierarchical layers, each section of the cross-sectional representation 601 can form a fractal-like structure as illustrated in FIG. 6. Moreover, the cross-sectional representation 601 can be an enlarged version of another reduced-size cross-sectional representation located in a section of another cross-sectional representation (not shown). The center portions 630, 730, 830, and 930 represent groups (of devices) in different hierarchical layers of the network, whereas the group in center portion 630 belongs to a higher hierarchical layer than the groups in center portions 730, 830, and 930.

Moreover, the sections 910 in the ring-shaped portion of the cross-sectional representation 901 represent the various groups (of devices) from the associated group of the linked group corresponding to the cross-sectional representation 901, whereas these various groups are in the lowest hierarchical layer of the network. The devices of these various groups can be diagrammed in the sections 910. In addition, the interconnections among these devices, the connections between these devices and the group(s) from a higher hierarchical layer, or any other network information can also be included in the sections 910. As illustrated in the sections 910 of FIG. 6, these various groups of the lowest hierarchical layer each have two devices.

Whenever necessary or needed, the cross-sectional representations 701, 801, and 901 are formed to reveal the relevant details of lower hierarchical layers and some details of even lower hierarchical layers. Additionally, in the reduced-size cross-sectional representation 612A, each reduced-size section has a miniature version of one of the reduced-size cross-sectional representations of the cross-sectional representation 701. Similarly, in the reduced-size cross-sectional representation 710A, each reduced-size section has a miniature version of one of the reduced-size cross-sectional representations of the cross-sectional representation 801. More importantly, the configurations of the cross-sectional representations and the reduced-size cross-sectional representations depend on their corresponding linked groups, as described in detail with respect to FIG. 5.

There are several benefits arising from the exemplary multi-layered cross-sectional diagram 600. The exemplary multi-layered cross-sectional diagram 600 exhibits sufficient modularity, scalability, and size flexibility to handle a wide range of networks and to deal with a wide variety of network sizes, including small networks, growing networks, and large networks. As illustrated in FIGS. 5 and 6, each cross-sectional representation has modular groupings that are further subdivided into other modular groupings. In addition, the exemplary multi-layered cross-sectional diagram 600 facilitates localized modifications to reflect changes in the network. As an example, additional hierarchical layers of the network can be diagrammed by forming additional cross-sectional representations. Also, new hierarchical layers can be inserted by forming new cross-sectional representations between exiting cross-sectional representations. For example, a new cross-sectional representation can be formed such that it is an enlarged version of the reduced-size cross-sectional representation 612A located in section 612 of cross-sectional representation 601. Moreover, the cross-sectional representation 701 can be formed such that it is an enlarged version of a reduced-size cross-sectional representation located in a section of new cross-sectional representation.

Finally, if additional groups are added to a hierarchical layer of the network, the size of the cross-sectional representation does not necessarily increase. Rather, size of each section of the ring-shaped portion can be reduced to accommodate additional groups.

Figure 7:
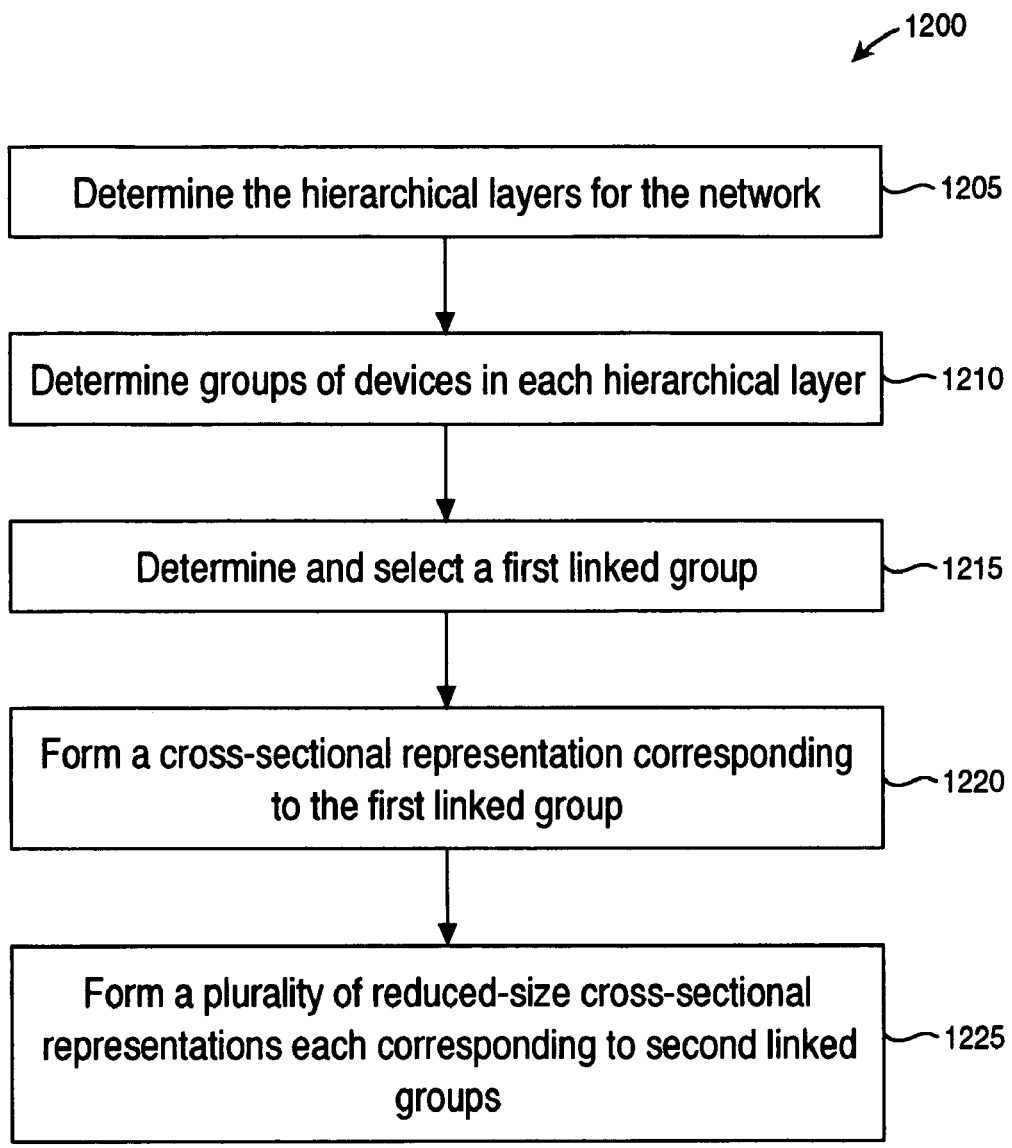
FIG. 7 illustrates a flow chart showing a method of diagramming a network by using a multi-layered cross-sectional diagram of the present invention.

FIG. 7 illustrates a flow chart showing a method 1200 of diagramming a network by using a multi-layered cross-sectional diagram in accordance with an embodiment of the present invention. As an example, the multi-layered cross-sectional diagram of the present invention will be utilized to diagram the network which was previously diagrammed using several prior art techniques in FIGS. 1, 2, and 3. It should be understood that the multi-layered cross-sectional diagram of the present invention can be applied to any type of network (e.g., computer network, telephone network, data network, communication network, etc.). Moreover, the devices of the network can be of any type (e.g., servers, routers, switches, computers, telephone switches, telephones, etc.).

At step 1205, the hierarchical layers of the network (FIG. 1) are determined. Any criteria can be used to determine the hierarchical layers of the network. For example, the various hierarchical layers can correspond to different categories of devices, relative location of the devices, etc. The devices of the network are arranged in the hierarchical layers.

Moreover, at step 1210, in each hierarchical layer various groups of devices are determined. Each group has one or more devices. The devices are grouped according to any criteria, including geographical location, function, type, etc. For example, the hierarchical layers 32, 34, 36, and 38 and the groups of devices of the network are illustrated in FIG. 3.

Furthermore, at step 1215, a first linked group is determined and selected. As described above, the multi-layered cross-sectional diagram of the present invention provides a cross-sectional view of a localized portion of the network. These localized portions are linked groups. Each linked group has a particular group from a hierarchical layer and has an associated group from a lower hierarchical layer, whereas the associated group includes one or more groups from the lower hierarchical layer. Moreover, in the network architecture, each group from the associated group is connected (e.g., wired connection, wireless connection, etc.) to the particular group. FIG. 3A illustrates linked groups 510, 520, 530, 540, 550, and 560 that were determined and can be selected. For illustrative purposes, the linked group 560 is determined and selected. The linked group 560 has the group 22 (which has three devices) from the highest hierarchical layer 32 and has the associated group that includes the groups 24A, 24B, and 24C (FIG. 2 and FIG. 3A) from the lower hierarchical layer 34.

Continuing at step 1220, a cross-sectional representation corresponding to the first linked group (e.g., linked group 560) is formed. The cross-sectional representation is circular-shaped and is similar to the exemplary multi-layered cross-sectional diagram illustrated in FIGS. 5 and 6. The cross-sectional representation has a center portion (or inner portion) for diagramming the group 22 (which has three devices) and has a ring-shaped portion (or outer portion) which includes three sections. Each section corresponds to a group (e.g., group 24A, group 24B, group 24C) from the associated group from the linked group 560. A first section corresponds to the group 24A. A second section corresponds to the group 24B. A third section corresponds to the group 24C.

Here, the groups 24A, 24B, and 24C from the associated group of the linked group 560 form a plurality of second linked groups 530, 540, and 550 (FIG. 3A). Each second linked group 530, 540, and 550 includes one from the groups 24A, 24B, and 24C of the lower hierarchical layer 34 and a second associated group having at least one group from the further lower hierarchical layer 36. The second linked group 530 includes the group 24A from the lower hierarchical layer 34 and the second associated group having the groups 26B and 26C from the further lower hierarchical layer 36, whereas in the network architecture each group 26B and 26C from the second associated group is connected (e.g., wired connection, wireless connection, etc.) to the group 24A. The second linked group 540 includes the group 24B from the lower hierarchical layer 34 and the second associated group having the groups 26E and 26F from the further lower hierarchical layer 36, whereas in the network architecture each group 26E and 26F from the second associated group is connected (e.g., wired connection, wireless connection, etc.) to the group 24B. The second linked group 550 includes the group 24C from the lower hierarchical layer 34 and the second associated group having the groups 26A and 26D from the further lower hierarchical layer 36, whereas in the network architecture each group 26A and 26D from the second associated group is connected (e.g., wired connection, wireless connection, etc.) to the group 24C.

At step 1225, a plurality of reduced-size cross-sectional representations corresponding to the second linked groups 530, 540, and 550 (FIG. 3A) are formed. Each reduced-sized cross-sectional representation is similar to the cross-sectional representation. In addition, the reduced-sized cross-sectional representations are located in the sections of the cross-sectional representation.

Moreover, each reduced-size cross-sectional representation has a reduced-size center portion for diagramming the group (24A, 24B, or 24C) corresponding to the section in which the reduced-size center portion is located. Also, each reduced-size cross-sectional representation has a reduced-size ring-shaped portion which has two reduced-size sections each corresponding to a group from the second associated group (e.g., groups 26B and 26C, groups 26E and 26F, or groups 26A and 26D) of the second linked group (530, 540, or 550) corresponding to the reduced-size cross-sectional representation. In each reduced-size cross-sectional representation, each reduced-size section can have a miniature version of an additional reduced-size cross-sectional representation each corresponding to one of several third linked groups (e.g., linked groups 510 and 520 of FIG. 3A). Each third linked group (e.g., linked groups 510 and 520 of FIG. 3A) includes one from the groups 26A–26F of the further lower hierarchical layer 36 and a third associated group having three groups (e.g., from groups 28A–28S) from the lowest hierarchical layer 38.

By selecting a different linked group (e.g., second linked group 530, 540, or 550; third linked groups 510 or 520; etc.) in step 1215 and repeating steps 1220–1225 based on the different linked group, the fractal-like structure of the multi-layered cross-sectional diagram is created. The detail level of the multi-layered cross-sectional diagram can be increased by forming additional cross-sectional representations (standard-size and reduced-sized) and can be decreased by eliminating cross-sectional representations, as illustrated in FIGS. 5 and 6. In particular, the groups 28A–28S (FIG. 2) from the lowest hierarchical layer 38 can be diagrammed in the sections of the ring-shaped portion of the cross-sectional representation associated with the lowest hierarchical layer 38 (as was done in cross-sectional representation 901 in FIG. 6).

Those skilled in the art will recognize that portions of the present invention may be incorporated as computer instructions stored as computer program code on a computer-readable medium such as a magnetic disk, CD-ROM, and other media common in the art or that may yet be developed.

Finally, aspects of the present invention can be implemented as an application, namely, a set of instructions (e.g., program code) which may, for example, be resident in the random access memory of a computer system. Until required by the computer system, the set of instructions may be stored in another computer memory, for example, in a hard drive, or in a removable memory such as an optical disk (for eventual use in a CD-ROM) or floppy disk (for eventual use in a floppy disk drive), or downloaded via the Internet or other computer network. In addition, although the various methods of the present invention described above can be conveniently implemented in a computer system selectively activated or reconfigured by software, one of ordinary skill in the art would also recognize that such methods of the present invention may be carried out in hardware, firmware, or in a more specialized apparatus constructed to perform the required methods of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of diagramming a network having a plurality of devices, comprising the steps of:
    a) determining a plurality of hierarchical layers for said network, wherein said devices are arranged in said hierarchical layers;
    b) determining one or more groups in each hierarchical layer, wherein each group includes at least one device;
    c) determining a first linked group having a first group from a first hierarchical layer and a first associated group having at least one group from a second hierarchical layer;
    d) displaying via a display device a first cross-sectional representation corresponding to said first linked group, wherein said first cross-sectional representation has a first inner portion representing said first group and a first outer portion having one or more sections each section corresponding to a group from said first associated group; and
    e) displaying via said display device a plurality of initial reduced-size cross-sectional representations each located in each section of said first cross-sectional representation, wherein each initial reduced-size cross-sectional representation is similar to said first cross-sectional representation, wherein each group from said first associated group forms one of a plurality of second linked groups each second linked group having said group from said first associated group and a second associated group having at least one group from a third hierarchical layer, wherein each initial reduced-size cross-sectional representation has a reduced-size outer portion and a reduced-size inner portion, wherein each reduced-size inner portion represents said group which is from said first associated group and which is associated with said section in which said reduced-size inner portion is located, and wherein each reduced-size outer portion has one or more reduced-size sections each reduced-size section corresponding to a group from said second associated group of one of said second linked groups.

2. A method as recited in claim 1 further comprising the steps of:
    f) displaying via said display device a second cross-sectional representation corresponding to one of said initial reduced-size cross-sectional representations, wherein said second cross-sectional representation has a second outer portion and a second inner portion each portion configured to represent an enlarged version of said reduced-size outer portion and said reduced-size inner portion respectively of said initial reduced-size cross-sectional representation, wherein said second cross-sectional representation is similar to said first cross-sectional representation; and
    g) displaying via said display device a plurality of additional reduced-size cross-sectional representations each located in each section of said second outer portion of said second cross-sectional representation, wherein each additional reduced-size cross-sectional representation is similar to said second cross-sectional representation, wherein each group from said second associated group forms one of a plurality of third linked groups each third linked group having said group from said second associated group and a third associated group having at least one group from a fourth hierarchical layer, wherein each additional reduced-size cross-sectional representation has a second reduced-size outer portion and a second reduced-size inner portion, wherein each second reduced-size inner portion represents said group which is from said second associated group and which is associated with said section in which said second reduced-size inner portion is located, and wherein each second reduced-size outer portion has one or more second reduced-size sections each second reduced-size section corresponding to a group from said third associated group of one of said third linked groups.

3. A method as recited in claim 2 wherein a miniature version of one of said additional reduced-size cross-sectional representations is located in each reduced-size section of each initial reduced-size cross-sectional representation.

4. A method as recited in claim 2 further comprising the steps of:
    h) displaying via said display device a third cross-sectional representation corresponding to one of said additional reduced-size cross-sectional representations, wherein said third cross-sectional representation has a third outer portion and a third inner portion each portion configured to represent an enlarged version of said second reduced-size outer portion and said second reduced-size inner portion respectively of said additional reduced-size cross-sectional representation, wherein said third cross-sectional representation is similar to said second cross-sectional representation; and
    i) displaying via said display device a plurality of next reduced-size cross-sectional representations each located in each section of said third outer portion of said third cross-sectional representation, wherein each next reduced-size cross-sectional representation is similar to said third cross-sectional representation, wherein each group from said third associated group forms one of a plurality of fourth linked groups each fourth link group having said group from said third associated group and a fourth associated group having at least one group from a fifth hierarchical layer, wherein each next reduced-size cross-sectional representation has a third reduced-size outer portion and a third reduced-size inner portion, wherein each third reduced-size inner portion represents said group which is from said third associated group and which is associated with said section in which said third reduced-size inner portion is located, and wherein each third reduced-size outer portion has one or more third reduced-size sections each third reduced-size section corresponding to a group from said fourth associated group of one of said fourth linked groups.

5. A method as recited in claim 1 wherein said first cross-sectional representation and said initial reduced-size cross-sectional representations each have a circular shape.

6. A method as recited in claim 1 wherein said first outer portion and said reduced-size outer portions each have a ring shape.

7. A method of diagramming a network having a plurality of devices, comprising the steps of:
- a) determining a plurality of hierarchical layers for said network, wherein said devices are arranged in said hierarchical layers;
- b) determining one or more groups in each hierarchical layer, wherein each group includes at least one device; and
- c) displaying via a display device a multi-layered cross-sectional diagram corresponding to said network, wherein said multi-layered cross-sectional diagram has a plurality of cross-sectional representations which are similar to each other, wherein said plurality of cross-sectional representations have a plurality of sizes, and wherein each cross-sectional representation visually represents a group from a hierarchical layer and visually represents one or more other groups from another hierarchical layer, wherein said step c) includes:
  - c1) determining a first linked group having a first group from a first hierarchical layer and a first associated group having at least one group from a second hierarchical layer;
  - c2) displaying via said display device a first cross-sectional representation corresponding to said first linked group, wherein said first cross-sectional representation has a first inner portion representing said first group and a first outer portion having one or more sections each section corresponding to a group from said first associated group; and
  - c3) displaying via said display device a plurality of initial reduced-size cross-sectional representations each located in each section of said first cross-sectional representation, wherein each initial reduced-size cross-sectional representation is similar to said first cross-sectional representation, wherein each group from said first associated group forms one of a plurality of second linked groups each second linked group having said group from said first associated group and a second associated group having at least one group from a third hierarchical layer, wherein each initial, reduced-size cross-sectional representation has a reduced-size outer portion and a reduced-size inner portion, wherein each reduced-size inner portion represents said group which is from said first associated group and which is associated with said section in which said reduced-size inner portion is located, and wherein each reduced-size outer portion has one or more reduced-size sections each reduced-size section corresponding to a group from said second associated group of one of said second linked groups.

8. A method as recited in claim 7 wherein said step c) further comprises the steps of:
- c4) displaying via said display device a second cross-sectional representation corresponding to one of said initial reduced-size cross-sectional representations, wherein said second cross-sectional representation has a second outer portion and a second inner portion each portion configured to represent an enlarged version of said reduced-size outer portion and said reduced-size inner portion respectively of said initial reduced-size cross-sectional representation, wherein said second cross-sectional representation is similar to said first cross-sectional representation; and
- c5) displaying via said display device a plurality of additional reduced-size cross-sectional representations each located in each section of said second outer portion of said second cross-sectional representation, wherein each additional reduced-size cross-sectional representation is similar to said second cross-sectional representation, wherein each group from said second associated group forms one of a plurality of third linked groups each third linked group having said group from said second associated group and a third associated group having at least one group from a fourth hierarchical layer, wherein each additional reduced-size cross-sectional representation has a second reduced-size outer portion and a second reduced-size inner portion, wherein each second reduced-size inner portion represents said group which is from said second associated group and which is associated with said section in which said second reduced-size inner portion is located, and wherein each second reduced-size outer portion has one or more second reduced-size sections each second reduced-size section corresponding to a group from said third associated group of one of said third linked groups.

9. A method as recited in claim 8 wherein a miniature version of one of said additional reduced-size cross-sectional representations is located in each reduced-size section of each initial reduced-size cross-sectional representation.

10. A method as recited in claim 8 wherein said step c) further comprises the steps of:
- c6) displaying via said display device a third cross-sectional representation corresponding to one of said additional reduced-size cross-sectional representations, wherein said third cross-sectional representation has a third outer portion and a third inner portion each portion configured to represent an enlarged version of said second reduced-size outer portion and said second reduced-size inner portion respectively of said additional reduced-size cross-sectional representation, wherein said third cross-sectional representation is similar to said second cross-sectional representation; and
- c7) displaying via said display device a plurality of next reduced-size cross-sectional representations each located in each section of said third outer portion of said third cross-sectional representation, wherein each next reduced-size cross-sectional representation is similar to said third cross-sectional representation, wherein each group from said third associated group forms one of a plurality of fourth linked groups each fourth link group having said group from said third associated group and a fourth associated group having at least one group from a fifth hierarchical layer, wherein each next reduced-size cross-sectional representation has a third reduced-size outer portion and a third reduced-size inner portion, wherein each third reduced-size inner portion represents said group which is from said third associated group and which is associated with said section in which said third reduced-size inner portion is located, and wherein each third reduced-size outer portion has one or more third reduced-size sections each third reduced-size section corresponding to a group from said fourth associated group of one of said fourth linked groups.

11. A method as recited in claim 7 wherein said first cross-sectional representation and said initial reduced-size cross-sectional representations each have a circular shape.

12. A method as recited in claim 7 wherein said first outer portion and said reduced-size outer portions each have a ring shape.

13. A computer system comprising:
   a bus;
   a processor coupled to said bus; and
   a computer readable memory device coupled to said bus and having computer-executable instructions stored therein for performing a method of diagramming a network having a plurality of devices, said method comprising the steps of:
   a) determining a plurality of hierarchical layers for said network, wherein said devices are arranged in said hierarchical layers;
   b) determining one or more groups in each hierarchical layer, wherein each group includes at least one device;
   c) determining a first linked group having a first group from a first hierarchical layer and a first associated group having at least one group from a second hierarchical layer;
   d) forming a first cross-sectional representation corresponding to said first linked group, wherein said first cross-sectional representation has a first inner portion representing said first group and a first outer portion having one or more sections each section corresponding to a group from said first associated group; and
   e) forming a plurality of initial reduced-size cross-sectional representations each located in each section of said first cross-sectional representation, wherein each initial reduced-size cross-sectional representation is similar to said first cross-sectional representation, wherein each group from said first associated group forms one of a plurality of second linked groups each second linked group having said group from said first associated group and a second associated group having at least one group from a third hierarchical layer, wherein each initial reduced-size cross-sectional representation has a reduced-size outer portion and a reduced-size inner portion, wherein each reduced-size inner portion represents said group which is from said first associated group and which is associated with said section in which said reduced-size inner portion is located, and wherein each reduced-size outer portion has one or more reduced-size sections each reduced-size section corresponding to a group from said second associated group of one of said second linked groups.

14. A computer system as recited in claim 13 further comprising the steps of:
   f) forming a second cross-sectional representation corresponding to one of said initial reduced-size cross-sectional representations, wherein said second cross-sectional representation has a second outer portion and a second inner portion each portion configured to represent an enlarged version of said reduced-size outer portion and said reduced-size inner portion respectively of said initial reduced-size cross-sectional representation, wherein said second cross-sectional representation is similar to said first cross-sectional representation; and
   g) forming a plurality of additional reduced-size cross-sectional representations each located in each section of said second outer portion of said second cross-sectional representation, wherein each additional reduced-size cross-sectional representation is similar to said second cross-sectional representation, wherein each group from said second associated group forms one of a plurality of third linked groups each third linked group having said group from said second associated group and a third associated group having at least one group from a fourth hierarchical layer, wherein each additional reduced-size cross-sectional representation has a second reduced-size outer portion and a second reduced-size inner portion, wherein each second reduced-size inner portion represents said group which is from said second associated group and which is associated with said section in which said second reduced-size inner portion is located, and wherein each second reduced-size outer portion has one or more second reduced-size sections each second reduced-size section corresponding to a group from said third associated group of one of said third linked groups.

15. A computer system as recited in claim 14 wherein a miniature version of one of said additional reduced-size cross-sectional representations is located in each reduced-size section of each initial reduced-size cross-sectional representation.

16. A computer system as recited in claim 14 further comprising the steps of:
   h) forming a third cross-sectional representation corresponding to one of said additional reduced-size cross-sectional representations, wherein said third cross-sectional representation has a third outer portion and a third inner portion each portion configured to represent an enlarged version of said second reduced-size outer portion and said second reduced-size inner portion respectively of said additional reduced-size cross-sectional representation, wherein said third cross-sectional representation is similar to said second cross-sectional representation; and
   i) forming a plurality of next reduced-size cross-sectional representations each located in each section of said third outer portion of said third cross-sectional representation, wherein each next reduced-size cross-sectional representation is similar to said third cross-sectional representation, wherein each group from said third associated group forms one of a plurality of fourth linked groups each fourth link group having said group from said third associated group and a fourth associated group having at least one group from a fifth hierarchical layer, wherein each next reduced-size cross-sectional representation has a third reduced-size outer portion and a third reduced-size inner portion, wherein each third reduced-size inner portion represents said group which is from said third associated group and which is associated with said section in which said third reduced-size inner portion is located, and wherein each third reduced-size outer portion has one or more third reduced-size sections each third reduced-size section corresponding to a group from said fourth associated group of one of said fourth linked groups.

17. A computer system as recited in claim 13 wherein said first cross-sectional representation and said initial reduced-size cross-sectional representations each have a circular shape.

18. A computer system as recited in claim 13 wherein said first outer portion and said reduced-size outer portions each have a ring shape.

19. A computer system comprising:
 a bus;
 a processor coupled to said bus; and
 a computer readable memory device coupled to said bus and having computer-executable instructions stored therein for performing a method of diagramming a network having a plurality of devices, said method comprising the steps of:
 a) determining a plurality of hierarchical layers for said network, wherein said devices are arranged in said hierarchical layers;
 b) determining one or more groups in each hierarchical layer, wherein each group includes at least one device; and
 c) forming a multi-layered cross-sectional diagram corresponding to said network, wherein said multi-layered cross-sectional diagram has a plurality of cross-sectional representations which are similar to each other, wherein said plurality of cross-sectional representations have a plurality of sizes, and wherein each cross-sectional representation visually represents a group from a hierarchical layer and visually represents one or more other groups from another hierarchical layer, wherein said step c) includes:
 c1) determining a first linked group having a first group from a first hierarchical layer and a first associated group having at least one group from a second hierarchical layer;
 c2) forming a first cross-sectional representation corresponding to said first linked group, wherein said first cross-sectional representation has a first inner portion representing said first group and a first outer portion having one or more sections each section corresponding to a group from said first associated group; and
 c3) forming a plurality of initial reduced-size cross-sectional representations each located in each section of said first cross-sectional representation, wherein each initial reduced-size cross-sectional representation is similar to said first cross-sectional representation, wherein each group from said first associated group forms one of a plurality of second linked groups each second linked group having said group from said first associated group and a second associated group having at least one group from a third hierarchical layer, wherein each initial reduced-size cross-sectional representation has a reduced-size outer portion and a reduced-size inner portion, wherein each reduced-size inner portion represents said group which is from said first associated group and which is associated with said section in which said reduced-size inner portion is located, and wherein each reduced-size outer portion has one or more reduced-size sections each reduced-size section corresponding to a group from said second associated group of one of said second linked groups.

20. A computer system as recited in claim 19 wherein said step c) further comprises the steps of:
 c4) forming a second cross-sectional representation corresponding to one of said initial reduced-size cross-sectional representations, wherein said second cross-sectional representation has a second outer portion and a second inner portion each portion configured to represent an enlarged version of said reduced-size outer portion and said reduced-size inner portion respectively of said initial reduced-size cross-sectional representation, wherein said second cross-sectional representation is similar to said first cross-sectional representation; and
 c5) forming a plurality of additional reduced-size cross-sectional representations each located in each section of said second outer portion of said second cross-sectional representation, wherein each additional reduced-size cross-sectional representation is similar to said second cross-sectional representation, wherein each group from said second associated group forms one of a plurality of third linked groups each third linked group having said group from said second associated group and a third associated group having at least one group from a fourth hierarchical layer, wherein each additional reduced-size cross-sectional representation has a second reduced-size outer portion and a second reduced-size inner portion, wherein each second reduced-size inner portion represents said group which is from said second associated group and which is associated with said section in which said second reduced-size inner portion is located, and wherein each second reduced-size outer portion has one or more second reduced-size sections each second reduced-size section corresponding to a group from said third associated group of one of said third linked groups.

21. A computer system as recited in claim 20 wherein a miniature version of one of said additional reduced-size cross-sectional representations is located in each reduced-size section of each initial reduced-size cross-sectional representation.

22. A computer system as recited in claim 20 wherein said step c) further comprises the steps of:
 c6) forming a third cross-sectional representation corresponding to one of said additional reduced-size cross-sectional representations, wherein said third cross-sectional representation has a third outer portion and a third inner portion each portion configured to represent an enlarged version of said second reduced-size outer portion and said second reduced-size inner portion respectively of said additional reduced-size cross-sectional representation, wherein said third cross-sectional representation is similar to said second cross-sectional representation; and
 c7) forming a plurality of next reduced-size cross-sectional representations each located in each section of said third outer portion of said third cross-sectional representation, wherein each next reduced-size cross-sectional representation is similar to said third cross-sectional representation, wherein each group from said third associated group forms one of a plurality of fourth linked groups each fourth link group having said group from said third associated group and a fourth associated group having at least one group from a fifth hierarchical layer, wherein each next reduced-size cross-sectional representation has a third reduced-size outer portion and a third reduced-size inner portion, wherein each third reduced-size inner portion represents said group which is from said third associated group and which is associated with said section in which said third reduced-size inner portion is located, and wherein each third reduced-size outer portion has one or more third reduced-size sections each third reduced-size section corresponding to a group from said fourth associated group of one of said fourth linked groups.

23. A computer system as recited in claim 19 wherein said first cross-sectional representation and said initial reduced-size cross-sectional representations each have a circular shape.

24. A computer system as recited in claim 19 wherein said first outer portion and said reduced-size outer portions each have a ring shape.

25. A computer-readable medium comprising computer-executable instructions stored therein for performing a method of diagramming a network having a plurality of devices, said method comprising the steps of:
  a) determining a plurality of hierarchical layers for said network, wherein said devices are arranged in said hierarchical layers;
  b) determining one or more groups in each hierarchical layer, wherein each group includes at least one device;
  c) determining a first linked group having a first group from a first hierarchical layer and a first associated group having at least one group from a second hierarchical layer;
  d) forming a first cross-sectional representation corresponding to said first linked group, wherein said first cross-sectional representation has a first inner portion representing said first group and a first outer portion having one or more sections each section corresponding to a group from said first associated group; and
  e) forming a plurality of initial reduced-size cross-sectional representations each located in each section of said first cross-sectional representation, wherein each initial reduced-size cross-sectional representation is similar to said first cross-sectional representation, wherein each group from said first associated group forms one of a plurality of second linked groups each second linked group having said group from said first associated group and a second associated group having at least one group from a third hierarchical layer, wherein each initial reduced-size cross-sectional representation has a reduced-size outer portion and a reduced-size inner portion, wherein each reduced-size inner portion represents said group which is from said first associated group and which is associated with said section in which said reduced-size inner portion is located, and wherein each reduced-size outer portion has one or more reduced-size sections each reduced-size section corresponding to a group from said second associated group of one of said second linked groups.

26. A computer-readable medium as recited in claim 25 wherein said method further comprises the steps of:
  f) forming a second cross-sectional representation corresponding to one of said initial reduced-size cross-sectional representations, wherein said second cross-sectional representation has a second outer portion and a second inner portion each portion configured to represent an enlarged version of said reduced-size outer portion and said reduced-size inner portion respectively of said initial reduced-size cross-sectional representation, wherein said second cross-sectional representation is similar to said first cross-sectional representation; and
  g) forming a plurality of additional reduced-size cross-sectional representations each located in each section of said second outer portion of said second cross-sectional representation, wherein each additional reduced-size cross-sectional representation is similar to said second cross-sectional representation, wherein each group from said second associated group forms one of a plurality of third linked groups each third linked group having said group from said second associated group and a third associated group having at least one group from a fourth hierarchical layer, wherein each additional reduced-size cross-sectional representation has a second reduced-size outer portion and a second reduced-size inner portion, wherein each second reduced-size inner portion represents said group which is from said second associated group and which is associated with said section in which said second reduced-size inner portion is located, and wherein each second reduced-size outer portion has one or more second reduced-size sections each second reduced-size section corresponding to a group from said third associated group of one of said third linked groups.

27. A computer-readable medium as recited in claim 26 wherein a miniature version of one of said additional reduced-size cross-sectional representations is located in each reduced-size section of each initial reduced-size cross-sectional representation.

28. A computer-readable medium as recited in claim 26 wherein said method further comprises the steps of:
  h) forming a third cross-sectional representation corresponding to one of said additional reduced-size cross-sectional representations, wherein said third cross-sectional representation has a third outer portion and a third inner portion each portion configured to represent an enlarged version of said second reduced-size outer portion and said second reduced-size inner portion respectively of said additional reduced-size cross-sectional representation, wherein said third cross-sectional representation is similar to said second cross-sectional representation; and
  i) forming a plurality of next reduced-size cross-sectional representations each located in each section of said third outer portion of said third cross-sectional representation, wherein each next reduced-size cross-sectional representation is similar to said third cross-sectional representation, wherein each group from said third associated group forms one of a plurality of fourth linked groups each fourth link group having said group from said third associated group and a fourth associated group having at least one group from a fifth hierarchical layer, wherein each next reduced-size cross-sectional representation has a third reduced-size outer portion and a third reduced-size inner portion, wherein each third reduced-size inner portion represents said group which is from said third associated group and which is associated with said section in which said third reduced-size inner portion is located, and wherein each third reduced-size outer portion has one or more third reduced-size sections each third reduced-size section corresponding to a group from said fourth associated group of one of said fourth linked groups.

29. A computer-readable medium as recited in claim 25 wherein said first cross-sectional representation and said initial reduced-size cross-sectional representations each have a circular shape.

30. A computer-readable medium as recited in claim 25 wherein said first outer portion and said reduced-size outer portions each have a ring shape.

31. A computer-readable medium comprising computer-executable instructions stored therein for performing a method of diagramming a network having a plurality of devices, said method comprising the steps of:
  a) determining a plurality of hierarchical layers for said network, wherein said devices are arranged in said hierarchical layers;
  b) determining one or more groups in each hierarchical layer, wherein each group includes at least one device; and
  c) forming a multi-layered cross-sectional diagram corresponding to said network, wherein said multi-layered cross-sectional diagram has a plurality of cross-sectional representations which are similar to each other, wherein said plurality of cross-sectional representations have a plurality of sizes, and wherein each cross-sectional representation visually represents a group from a hierarchical layer and visually represents one or more other groups from another hierarchical layer, wherein said step c) includes:
- c1) determining a first linked group having a first group from a first hierarchical layer and a first associated group having at least one group from a second hierarchical layer;
- c2) forming a first cross-sectional representation corresponding to said first linked group, wherein said first cross-sectional representation has a first inner portion representing said first group and a first outer portion having one or more sections each section corresponding to a group from said first associated group; and
- c3) forming a plurality of initial reduced-size cross-sectional representations each located in each section of said first cross-sectional representation, wherein each initial reduced-size cross-sectional representation is similar to said first cross-sectional representation, wherein each group from said first associated group forms one of a plurality of second linked groups each second linked group having said group from said first associated group and a second associated group having at least one group from a third hierarchical layer, wherein each initial reduced-size cross-sectional representation has a reduced-size outer portion and a reduced-size inner portion, wherein each reduced-size inner portion represents said group which is from said first associated group and which is associated with said section in which said reduced-size inner portion is located, and wherein each reduced-size outer portion has one or more reduced-size sections each reduced-size section corresponding to a group from said second associated group of one of said second linked groups.

32. A computer-readable medium as recited in claim 31 wherein said step c) further comprises the steps of:
- c4) forming a second cross-sectional representation corresponding to one of said initial reduced-size cross-sectional representations, wherein said second cross-sectional representation has a second outer portion and a second inner portion each portion configured to represent an enlarged version of said reduced-size outer portion and said reduced-size inner portion respectively of said initial reduced-size cross-sectional representation, wherein said second cross-sectional representation is similar to said first cross-sectional representation; and
- c5) forming a plurality of additional reduced-size cross-sectional representations each located in each section of said second outer portion of said second cross-sectional representation, wherein each additional reduced-size cross-sectional representation is similar to said second cross-sectional representation, wherein each group from said second associated group forms one of a plurality of third linked groups each third linked group having said group from said second associated group and a third associated group having at least one group from a fourth hierarchical layer, wherein each additional reduced-size cross-sectional representation has a second reduced-size outer portion and a second reduced-size inner portion, wherein each second reduced-size inner portion represents said group which is from said second associated group and which is associated with said section in which said second reduced-size inner portion is located, and wherein each second reduced-size outer portion has one or more second reduced-size sections each second reduced-size section corresponding to a group from said third associated group of one of said third linked groups.

33. A computer-readable medium as recited in claim 32 wherein a miniature version of one of said additional reduced-size cross-sectional representations is located in each reduced-size section of each initial reduced-size cross-sectional representation.

34. A computer-readable medium as recited in claim 32 wherein said step c) further comprises the steps of:
- c6) forming a third cross-sectional representation corresponding to one of said additional reduced-size cross-sectional representations, wherein said third cross-sectional representation has a third outer portion and a third inner portion each portion configured to represent an enlarged version of said second reduced-size outer portion and said second reduced-size inner portion respectively of said additional reduced-size cross-sectional representation, wherein said third cross-sectional representation is similar to said second cross-sectional representation; and
- c7) forming a plurality of next reduced-size cross-sectional representations each located in each section of said third outer portion of said third cross-sectional representation, wherein each next reduced-size cross-sectional representation is similar to said third cross-sectional representation, wherein each group from said third associated group forms one of a plurality of fourth linked groups each fourth link group having said group from said third associated group and a fourth associated group having at least one group from a fifth hierarchical layer, wherein each next reduced-size cross-sectional representation has a third reduced-size outer portion and a third reduced-size inner portion, wherein each third reduced-size inner portion represents said group which is from said third associated group and which is associated with said section in which said third reduced-size inner portion is located, and wherein each third reduced-size outer portion has one or more third reduced-size sections each third reduced-size section corresponding to a group from said fourth associated group of one of said fourth linked groups.

35. A computer-readable medium as recited in claim 31 wherein said first cross-sectional representation and said initial reduced-size cross-sectional representations each have a circular shape.

36. A computer-readable medium as recited in claim 31 wherein said first outer portion and said reduced-size outer portions each have a ring shape.

* * * * *